US009868832B2

(12) United States Patent
Walker, Jr. et al.

(10) Patent No.: US 9,868,832 B2
(45) Date of Patent: Jan. 16, 2018

(54) THERMOFORMABLE MICROSPHERE ARTICLES

(71) Applicant: 3M INNOVATIVE PROPERTIES COMPANY, St. Paul, MN (US)

(72) Inventors: Christopher B. Walker, Jr., St. Paul, MN (US); Joseph D. Rule, Woodbury, MN (US); Vivek Krishnan, St. Paul, MN (US); John C. Clark, Maplewood, MN (US); Steven J. McMan, Stillwater, MN (US); Toheeb B Alabi, Woodbury, MN (US); Charlie C. Ho, Woodbury, MN (US); Ryan E. Marx, Rosemount, MN (US); Alexander J. Kugel, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/479,496

(22) Filed: Apr. 5, 2017

(65) Prior Publication Data
US 2017/0204234 A1    Jul. 20, 2017

Related U.S. Application Data

(63) Continuation of application No. 14/433,054, filed as application No. PCT/US2013/063392 on Oct. 4, 2013, now Pat. No. 9,650,499.

(60) Provisional application No. 61/791,918, filed on Mar. 15, 2013, provisional application No. 61/709,366, filed on Oct. 4, 2012.

(51) Int. Cl.
| C08K 7/20 | (2006.01) |
| C08J 5/18 | (2006.01) |
| C08K 7/18 | (2006.01) |
| B32B 3/08 | (2006.01) |
| B32B 27/08 | (2006.01) |
| B32B 27/40 | (2006.01) |
| B32B 27/36 | (2006.01) |
| B32B 27/30 | (2006.01) |

(52) U.S. Cl.
CPC ............... *C08J 5/18* (2013.01); *B32B 3/085* (2013.01); *B32B 27/08* (2013.01); *B32B 27/36* (2013.01); *B32B 27/40* (2013.01); *C08K 7/18* (2013.01); *B32B 27/306* (2013.01); *B32B 27/308* (2013.01); *B32B 2264/104* (2013.01); *B32B 2451/00* (2013.01); *C08J 2375/04* (2013.01); *Y10T 428/252* (2015.01); *Y10T 428/254* (2015.01)

(58) Field of Classification Search
CPC ............ Y10T 428/252; Y10T 428/254; Y10T 428/24893; B32B 27/306; B32B 27/308; B32B 27/32; B32B 27/36; B32B 27/365; B32B 27/40; B32B 2255/00
See application file for complete search history.

(56) References Cited

U.S. PATENT DOCUMENTS

| 4,849,265 A | 7/1989 | Ueda et al. |
| 5,620,775 A | 4/1997 | LaPerre |
| 7,854,984 B2 | 12/2010 | O'Brien et al. |
| 2002/0146538 A1 | 10/2002 | Hedblom et al. |
| 2008/0118693 A1 | 5/2008 | Bilski et al. |
| 2009/0246439 A1 | 10/2009 | Kanno |

FOREIGN PATENT DOCUMENTS

EP    0 372 727    6/1990

OTHER PUBLICATIONS

PCT International Search Report for PCT/US2013/063392 dated Jan. 29, 2014, 5 pages.

*Primary Examiner* — Betelhem Shewareged
(74) *Attorney, Agent, or Firm* — Steven A. Bern; Dena M. Ehrich

(57) ABSTRACT

There is provided an article comprising at least a first surface having a first binder layer selected from at least one of linear resins and resins having low cross link densities, where the first binder layer has a first major surface opposite a second major surface; and a plurality of microspheres at least partially embedded in the first major surface of the first binder layer. There is also provided an article comprising a first surface having a first binder layer selected from at least one of linear resins and resins having low cross link densities; and a plurality of microspheres at least partially embedded a the first major surface of the first binder layer, where for at least a portion of the first major surface the plurality of microspheres covers 30% to 50% of that portion, and the microspheres are substantially uniformly spaced.

8 Claims, No Drawings

THERMOFORMABLE MICROSPHERE ARTICLES

CROSS REFERENCE TO RELATED APPLICATIONS

This application is a continuation of U.S. application Ser. No. 14/433,054, filed Apr. 2, 2015, now allowed, which is a national stage filing under 35 U.S.C. 371 of PCT/US2013/063392, filed Oct. 4, 2013, which claims the benefit of U.S. Provisional Application No. 61/791,918, filed Mar. 15, 2013 and U.S. Provisional Application No. 61/709,366, filed Oct. 4, 2012, the disclosure of which are incorporated by reference in their entirety herein.

FIELD

This disclosure relates to thermoformable articles that are coated with microspheres.

BACKGROUND

Decorative protective surfaces find many consumer applications. Household appliances, automotive interiors and paints, consumer electronic devices, such as laptops and hand held devices, are all examples where consumers prefer materials that deliver considerable protection from scratches, wear and abrasion while retaining high cosmetics and aesthetics through the material's lifecycle. High quality surfaces, free of cracks and/or other defects, are of particular interest to many consumers because of their aesthetic appeal.

Durable decorative laminates and films comprised of glass beads are broadly known. These low gloss constructions typically consist of exposed glass bead surfaces that impart high durability and decorative properties to the construction. Low friction properties of such constructions have also been disclosed. For example, U.S. Pat. No. 4,849,265 (Ueda) discloses decorative abrasion resistant laminates that contain hard microspheres (glass or plastic) that are either exposed or surface coated with a thin polymer coating. Another example is U.S. Pat. No. 5,620,775 (LaPerre), which discloses durable, low coefficient of friction polymeric films made by having an exposed glass bead surface with glass. Specifically, thermoformable polyurethane bead films and low coefficient of friction decorative bead films are known in the art, but crack-free low coefficient of friction thermoformed bead films with high abrasion resistance have not been described previously. There is a need for thermoformable polyurethane bead films that have a low coefficient of friction, high abrasion resistance, and are also crack-free.

SUMMARY

The present disclosure provides thermoformable polyurethane bead films that have a low coefficient of friction, high abrasion resistance, and are also crack-free. The present disclosure provides a preferred resin systems, including polyurethane dispersions, 2K urethanes coated from solvent, 100% solids 2K urethanes and 2 layer urethanes. Thermoformed polyurethane bead films with low levels of crosslinking are provided. In one aspect, the present disclosure provides the following embodiments:

In one aspect, the present disclosure provides an article comprising at least a first surface having: (a) a first binder layer selected from at least one of linear resins and resins having low cross link densities, wherein the first binder layer has a first major surface opposite a second major surface; and (b) a plurality of microspheres at least partially embedded in the first major surface of the first binder layer. In some embodiments, the resins having low cross link densities are those resins comprising lightly crosslinked material having a molecular weight per crosslink point of greater than about 2,800 g/mol.

In some embodiments, the plurality of microspheres are selected from at least one of glass, polymers, glass ceramics, ceramics, metals and combinations thereof. The article of any of the preceding embodiments wherein the linear resins are selected from at least one of the following linear materials: polyurethanes, polyureas, polyurethane ureas, polyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof. In some embodiments, the article has an elongation percent at failure of greater than 26%.

In some embodiments, at least about 60% of the surface of the article is covered with the plurality of microspheres. In some embodiments, the article further comprises a second layer disposed along the second major surface of the first binder layer. In some embodiments, the second layer comprises a thermoformable material. In some embodiments, the second layer comprises a material having a glass transition temperature greater than or equal to 60° C. and less than or equal to 130° C. In some embodiments, the second layer is amorphous polyester.

In another aspect, an article comprising a first surface having: (a) a first binder layer selected from at least one of linear resins and resins having low cross link densities, wherein the first binder layer has a first major surface opposite a second major surface; and (b) a plurality of microspheres at least partially embedded in the first major surface of the first binder layer, wherein for at least a portion of the first major surface the plurality of microspheres covers greater than or equal to 30% of that portion of the first major surface and less than or equal to 50% of that portion of the first major surface, and further wherein the microspheres are substantially uniformly spaced. In some embodiments, the first surface has a shape having at least one angle greater than or equal to 80°.

In some embodiments, the resins having low cross link densities are those resins comprising lightly crosslinked material having a molecular weight per crosslink point of greater than about 2,800 g/mol. In some embodiments, the plurality of microspheres are selected from at least one of glass, polymers, glass ceramics, ceramics, metals and combinations thereof.

In some embodiments, the linear resins are selected from at least one of the following linear materials: polyurethanes, polyureas, polyurethane ureas, polyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof.

In some embodiments, the article has an elongation percent at failure of greater than 26%. In some embodiments, at least about 60% of the surface of the article is covered with the plurality of microspheres.

In some embodiments, the article further comprises a second layer disposed along the second major surface of the first binder layer. In some embodiments, the second layer comprises a thermoformable material. In some embodiments, the second layer comprises a material having a glass transition temperature greater than or equal to 60° C. and less than or equal to 130° C. In some embodiments, the second layer is amorphous polyester.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

The present disclosure provides articles having at least a first surface that includes a first binder layer selected from at least one of linear resins and resins having low cross link densities, where the first binder layer has a first major surface opposite a second major surface; and a plurality of microspheres at least partially embedded in the first major surface of the first binder layer. In some embodiments, it is preferred that the article is thermoformable or stretchable. In order for the article to be thermoformable or stretchable, the materials in the article, such as the first binder layer, must have certain properties.

First, when the article is formed, the article must retain its formed dimensions. If the article has high elasticity, it can recover when the forming stresses are removed, essentially undoing the forming step. Therefore, high elasticity can be problematic. This issue can be avoided by using a material that undergoes melt flow at or near the forming or stretching temperature. In other cases, a component of the article can have elasticity at the forming temperature, but this elasticity is likely to exert a recovery force after forming. To prevent this elastic recovery, the elastic layer can be laminated with a material that does not show this elasticity. For example, this inelastic material can be a thermoplastic material such as PET.

The other criterion for the article to be formable is that it can bear the elongation that occurs during forming or stretching without failing, cracking, or generating other defects. This can be achieved by using materials that have a temperature at which they undergo melt flow and forming near that temperature. In some cases, crosslinked materials that do not flow can be used, but they are more likely to crack during the elongation. To avoid this cracking, the crosslink density should be kept low, as can be indicated by a low storage modulus in the rubbery plateau region. The expected degree of crosslinking can also approximated as the inverse of the average molecular weight per crosslink, which can be calculated based on the components of a material. In addition, it is preferred to do the forming at relatively low temperatures, since as temperatures increase above the glass transition temperature of crosslinked materials, their capacity for elongation begins to decrease.

Transfer Carrier

The transfer coating method of the present disclosure can be used to form the presently disclosed microsphere transfer article from which can be formed the presently disclosed microsphere article. The microsphere article has a surprisingly improved aesthetics.

The presently disclosed transfer carrier includes a support layer and a thermoplastic release layer bonded thereto. The thermoplastic release layer of the transfer carrier temporarily partially embeds a plurality of transparent microspheres. The transfer carrier has low adhesion to the plurality of transparent microspheres and to the binder layer in which the opposite sides of the plurality of transparent microspheres are at least partially embedded, so that the transfer carrier can be removed to expose the surface of the plurality of transparent microspheres.

Support Layers

The support layer should be "dimensionally stable". In other words it should not shrink, expand, phase change, etc. during the preparation of the transfer article. Useful support layers may be thermoplastic, non-thermoplastic or thermosetting, for example. One skilled in the art would be able to select a useful support layer for the presently disclosed transfer article. If the support layer is a thermoplastic layer it should preferably have a melting point above that of the thermoplastic release layer of the transfer carrier. Useful support layers for forming the transfer carrier include but are not limited to those selected from at least one of paper and polymeric films such as biaxially oriented polyethylene terephthalate (PET), polypropylene, polymethylpentene and the like which exhibit good temperature stability and tensile so they can undergo processing operations such as bead coating, adhesive coating, drying, printing, and the like.

Thermoplastic Release Layers

Useful thermoplastic release layers for forming the transfer carrier include but are not limited to those selected from at least one of polyolefins such as polyethylene, polypropylene, organic waxes, blends thereof, and the like. Low to medium density (about 0.910 to 0.940 g/cc density) polyethylene is preferred because it has a melting point high enough to accommodate subsequent coating and drying operations which may be involved in preparing the transfer article, and also because it releases from a range of adhesive materials which may be used as the binder layer, in addition to the plurality of transparent microspheres.

The thickness of the thermoplastic release layer is chosen according to the microsphere diameter distribution to be coated. The binder layer embedment becomes approximately the mirror image of the transfer carrier embedment. For example, a transparent microsphere which is embedded to about 30% of its diameter in the release layer of the transfer carrier is typically embedded to about 70% of its diameter in the binder layer. To maximize slipperiness and packing density of the plurality of microspheres, it is desirable to control the embedment process so that the upper surface of smaller microspheres and larger microspheres in a given population end up at about the same level after the transfer carrier is removed.

In order to partially embed the plurality of transparent microspheres in the release layer, the release layer should preferably be in a tacky state (either inherently tacky and/or by heating). The plurality of transparent microspheres may be partially embedded, for example, by coating a plurality of transparent microspheres on the thermoplastic release layer of the transfer carrier followed by one of (1)-(3):(1) heating the microsphere coated transfer carrier, (2) applying pressure to the microsphere coated transfer carrier (with, for example, a roller) or (3) heating and applying pressure to the microsphere coated transfer carrier.

For a given thermoplastic release layer, the microsphere embedment process is controlled primarily by temperature, time of heating and thickness of the thermoplastic release layer. As the thermoplastic release layer is melted, the smaller microspheres in any given population will embed at a faster rate and to a greater extent than the larger microspheres because of surface wetting forces. The interface of the thermoplastic release layer with the support layer becomes an embedment bounding surface since the microspheres will sink until they are stopped by the dimensionally stable support layer. For this reason it is preferable that this interface be relatively flat.

The thickness of the thermoplastic release layer should be chosen to prevent encapsulation of most of the smaller diameter microspheres so that they will not be pulled away from the binder layer when the transfer carrier is removed. On the other hand, the thermoplastic release layer must be thick enough so that the larger microspheres in the plurality of transparent microspheres are sufficiently embedded to prevent their loss during subsequent processing operations (such as coating with the binder layer, for example).

Microspheres

Microspheres useful in the present disclosure can be made from a variety of materials, such as glass, polymers, glass ceramics, ceramics, metals and combinations thereof. In some embodiments, the microspheres are glass beads. The glass beads are largely spherically shaped. The glass beads are typically made by grinding ordinary soda-lime glass or borosilicate glass, typically from recycled sources such as from glazing and/or glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation "NEXTERION GLASS D" from Schott Industries, Kansas City, Mo., and glass available under the trade designation "PYREX" from Corning Incorporated, New York, N.Y.

The grinding process yields a wide distribution of glass particle sizes. The glass particles are spherodized by treating in a heated column to melt the glass into spherical droplets, which are subsequently cooled. Not all the beads are perfect spheres. Some are oblate, some are melted together and some contain small bubbles.

Microspheres are preferably free of defects. As used herein, the phrase "free of defects" means that the microspheres have low amounts of bubbles, low amounts of irregular shaped particles, low surface roughness, low amount of inhomogeneities, low amounts undesirable color or tint, or low amounts of other scattering centers.

When the article is stretched during a forming process, the relative positions of the microspheres on the surface of the first binder layer will change. It is preferred that the change in position of the microspheres results in substantially uniform spacing. Substantially uniform spacing occurs when the distance between individual microspheres tends to increase as the article is deformed. This is in contrast to a less preferred situation when the distance between clusters of microspheres increases, but individual microspheres tend to remain close to each other. Also, if cracking occurs in the binder layer of an article, then gaps will grow between clusters of micropheres, and substantially uniform spacing will not occur. In some embodiments, the article can be elongated in one direction but not in another such that the microspheres tend to increase in separation in the direction of elongation but not increase in separation in the orthogonal direction. In this case, the resulting microspheres have substantially uniform spacing even though microspheres have relatively high separation in the direction of stretching but low separation in the orthogonal direction. Substantially uniform spacing is identified by observing the average distance between microspheres along any straight line on the surface of the film with a uniform distance between microspheres indicates uniform spacing. The average distance between microspheres when comparing two different lines in different directions on the surface of the film do not need to be similar to have substantially uniform spacing.

While not wishing to be bound by theory, it is believed that when microspheres are randomly applied in a full monolayer on a surface, they naturally have substantially uniform spacing because they are packed reasonably closely. However, if microspheres are randomly applied with lower area coverages, such as between 30% and 50% coverage, then they do not necessarily produce uniform spacing. For example, in some cases, clusters of several microspheres can form either by random or by electrostatic attraction leaving other areas on the surface void of microspheres. By first forming a more densely packed layer of microspheres and subsequently stretching the surface of the article, a more uniform spacing of microspheres can occur compared to a random placement of microspheres.

A substantially uniform spacing of microspheres in the formed articles is achieved when a proper balance of properties in the materials used in the article is provided. During a forming process, it is preferred that the binder layer have a moderate degree of elasticity. With elasticity that is too low, non-uniform distributions of microspheres can result. Without being bound by theory, it is believed that binders with low elasticity result in small regions where increased elongation causes less resistance to elongation, with the result being that these regions show a concentration of the strains of the elongation. In contrast, with too much elasticity, cracks can appear in the binder layer resulting in non-uniform spacing. In the case of non-crosslinked binder layers, the proper elasticity can be provided by forming the film in an optimal temperature range near the glass or melt transition temperature of the binder. In the case of crosslinked binder layers, the proper elasticity can be provided with the optimal degree of crosslinking.

Particle Sizing

The microspheres are typically sized via screen sieves to provide a useful distribution of particle sizes. Sieving is also used to characterize the size of the microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening. It is desirable to use as broad a size range as possible to control economics and maximize the packing of the microspheres on the binder layer surface. However, some applications may require limiting the microsphere size range to provide a more uniform microsphere coated surface. In some embodiments, a useful range of average microsphere diameters is about 5 μm to about 200 μm (typically about 35 to about 140 μm, preferably about 35 to 90 μm, and most preferably about 38 to about 75 μm). A small number (0 to 5% by weight based on the total number of microspheres) of smaller and larger microspheres falling outside the 20 to 180 micron range can be tolerated. In some embodiments, a multi-modal size distribution of microspheres is useful.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening. For our purposed the average cross-sectional diameter can be effectively measure by using the following stack of sieves.

| U.S. Sieve Designation No. | Nominal Opening (microns). |
| --- | --- |
| 80 | 180 |
| 100 | 150 |
| 120 | 125 |
| 140 | 106 |
| 170 | 90 |
| 200 | 75 |
| 230 | 63 |
| 270 | 53 |
| 325 | 45 |
| 400 | 38 |
| 500 | 25 |
| 635 | 20 |

Alternately, average diameter can be determined using any commonly known microscopic methods for sizing particles. For example, optical microscopy or scanning electron microscropy, and the like, can be used in combination with any image analysis software. For example, software commercially available as free ware under the trade designation "IMAGE J" from NIH, Bethesda, Md.

Adhesion Promoter

In some embodiments, the microspheres are treated with an adhesion promoter such as those selected from at least one of silane coupling agents, titanates, organo-chromium complexes, and the like, to maximize their adhesion to the first binder layer, especially with regard to moisture resistance.

The treatment level for such adhesion promoters is on the order of 50 to 1200 parts by weight adhesion promoter per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the adhesion promoter with the microspheres, followed by drying in a tumbler or auger-fed dryer to prevent the microspheres from sticking together. One skilled in the art would be able to determine how to best treat the microspheres with an adhesion promoter.

Binder Layer

The binder layer (also referred to as the "first binder layer") is typically an organic polymeric material. It should exhibit good adhesion to the transparent microspheres themselves or to the treated microspheres. It is also possible that an adhesion promoter for the microspheres could be added directly to the binder layer itself as long as it is compatible within the process window for disposing the binder layer on the surfaces of the microspheres. It is important that the binder layer has sufficient release from the thermoplastic release layer of the transfer carrier to allow removal of the transfer carrier from the microspheres, which are embedded on one side in the thermoplastic release layer and on the other side in the first binder layer.

Binders useful in the binder layer include, but are not limited to those selected from at least one of the following linear materials: polyurethanes, polyureas, polyurethane ureas, polyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof. In some embodiments, the polymer matrix composites include nanoparticles in resins, fibers in resins, and the like. Combinations can include any combinations of materials, such as interpenetrating networks, dual cure systems, and the like.

For the presently disclosed articles to be well formable, it is preferred that the binder layers are not crosslinked or are very lightly crosslinked. Lightly crosslinked materials are preferred over highly crosslinked materials because they produce less elastic recovery energy after being deformed in the forming process. Also, lightly crosslinked materials tend to accommodate higher degrees of elongation before failing compared to highly crosslinked materials. In some embodiments, non-crosslinked materials are preferred to give very high degrees of elongation and to withstand deformation at very high temperatures without failing. In some embodiments, lightly crosslinked materials are preferred over non-crosslinked materials to give better resistance to chemicals and resistance to creep and other dimensional instability over time.

Therefore, in some embodiment, the article includes an elastic layer coupled with a thermoplastic layer that has a relatively low forming temperature. Non-crystalline PET such as amorphous PET or PETG are some preferred thermoplastics with a low forming temperature. This thermoplastic later prevents elastic recovery of the other layer, but it can be formed a temperature low enough that the elastic layer still has good capacity for elongation.

The binder layer can be formed, for example, out of solution, aqueous dispersion, or 100% solids coating such as via hot melt or extrusion. The binder layer may be transparent, translucent, or opaque. It may be colored or colorless. The binder layer may, for example, be clear and colorless or pigmented with opaque, transparent, or translucent dyes and/or pigments. In some embodiments, inclusion of specialty pigments, such as for example metallic flake pigments, can be useful.

If retroreflective performance is desired in at least a portion of the surface layer of the presently disclosed microsphere coated article, such that a reflecting layer (such as a thin metallic layer such as an aluminum flake ink layer, for example) is coated on the buried (non-exposed) side of the transparent microspheres, it is preferred that the binder layer be transparent and thin such that it maintains the contours of the transparent microspheres, so that it can also function as a spacing layer to focus the incident light on the reflecting layer placed below it.

The binder layer is typically formed on the transfer carrier after the transparent microspheres have been partially embedded in the release layer of the transfer carrier. The binder layer is typically coated over the partially embedded transparent microspheres by a direct coating process but could also be provided over the transparent microspheres via thermal lamination either from a separate carrier or by first forming the binder layer on a separate substrate from which it is subsequently transferred to cover the transparent microspheres.

Substrate Layers

The presently disclosed microsphere coated articles and transfer articles can optionally comprise one or more substrate layer(s). Examples of suitable substrate layers include but are not limited to those selected from at least one of fabrics (including synthetics, non-synthetics, woven and non-woven such as nylon, polyester, etc.), polymer coated fabrics such as vinyl coated fabrics, polyurethane coated fabrics, etc.; leather; metal; paint coated metal; paper; polymeric films or sheets such as polyethylene terephthalate, acrylics, polycarbonate, polyurethane, elastomers such as natural and synthetic rubber, and the like. The substrates may, for example, be in the form of a clothing article; automobile, marine, or other vehicle seat coverings; automobile, marine, or other vehicle bodies; orthopedic devices; electronic devices, hand held devices, household appliances, and the like.

In the presently disclosed transfer and microsphere coated articles, the plurality of transparent microspheres are typically provided as a continuous layer in some embodiments or as a discontinuous layer in some embodiments. The binder layer is continuous in some embodiments or discontinuous in some embodiments. The substrate adhesive, when present, may be continuous in some embodiments or discontinuous in some embodiments. Typically, the substrate layer, when present, is continuous, although it may be discontinuous. In the presently disclosed microsphere coated articles all layers can optionally be continuous or discontinuous.

Graphic Layer Options

The present disclosed binder layer can optionally also perform the function of acting as the adhesive for a desired substrate and/or further comprise pigment(s) such that it also has a graphic function.

The binder layer, when selected to function also as a substrate adhesive, may be, for example, pigmented and provided in the form of an image, such as, for example, by screen printing the adhesive in the form of a graphic for transfer to a separate substrate. However, the binder layer, in some instances, is preferably colorless and transparent so that it can allow transmission of color from either a substrate, separate graphic layers (discontinuous colored polymeric layers) placed below it, or from a separate substrate adhesive that is optionally colored and optionally printed in the form of a graphic image (a discontinuous layer).

Typically, if a graphic image is desired it is provided separately on the surface of the binder layer opposite the plurality of transparent microspheres by at least one colored polymeric layer. The optional colored polymeric layer may, for example, comprise an ink. Examples of suitable inks for use in the present disclosure include but are not limited to those selected from at least one of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer, which can be an ink, can be printed via a range of methods including, but not limited to screen printing, flexographic printing, offset printing, lithography, transfer electrophotography, transfer foil, and direct or transfer xerography. The colored polymeric layer may be transparent, opaque, or translucent.

If retroreflective performance is desired, the colored polymeric layer or multiple colored polymeric layers should be thin enough to maintain the contour of the plurality of transparent microspheres. The last underlying layer should be a reflecting layer such as a polymeric layer containing nascent reflecting particles such as aluminum flake or a metallic layer such as vapor deposited aluminum. The resultant graphic image could be a combination of individual retroreflective and non-retroreflective images when opaque colored polymeric layers are printed in some areas and reflecting colored polymeric layers are printed in other areas. The graphic could encompass a broad range of color, especially if a 4-color graphic process is employed.

A colored polymeric layer(s) may be included in the articles of the present disclosure by a number of procedures. For example, a transfer carrier can have a layer of transparent microspheres embedded in the release layer thereof, following which the microsphere embedded surface of the release layer is coated with a transparent layer of binder. This microsphere and adhesive coated transfer carrier can function as a casting liner by coating, for example, a continuous colored plasticized vinyl layer over the binder layer and wet laminating a woven or non-woven fabric thereover.

Another method involves providing graphic layers (discontinuous colored polymeric layers, for example) on the binder layer prior to casting a continuous colored plasticized vinyl layer to approximate the image of leather, for example.

Optional Adhesive Layer(s)

The presently disclosed microsphere coated article and transfer article may each optionally further comprise one or more adhesive layers in addition to the binder layer. A substrate adhesive layer, for example, may optionally be included in the article in order to provide a means for bonding the binder layer or the layer(s) of material optionally bonded to the binder layers to a substrate. These optional adhesive layer(s) may be optionally present when, for example, the binder layer cannot function also as an adhesive for a desired substrate. A substrate adhesive layer (as well as any other optional adhesive layers) may comprise the same general types of polymeric materials used for the binder layer and may be applied following the same general procedures. However, each adhesive layer used must be selected such that it will adhere the desired layers together. For example, a substrate adhesive layer must be selected such that it can adhere to an intended substrate as well as to the other layer to which it is bonded.

Reinforcing Layer(s)

Optional layers may be included in the presently disclosed microsphere coated article and transfer article to, for example, enhance the ability to separate the transfer carrier from the layer of a plurality of transparent microsphere. Such an optional layer which in such an article can function as a reinforcing layer would typically be positioned in between the plurality of transparent microspheres and a substrate adhesive layer. Examples of useful reinforcing layers would include additional substrate layer(s), for example.

A transparent microsphere coated and adhesive coated transfer carrier could be coated with a fabric adhesive such as a polyester, or a polyamide, followed by lamination to a woven fabric or to a moisture transmitting membrane, to function as a slippery liner for clothing, for example.

Embossing

The articles of the present disclosure may optionally be embossed. The embossing procedure would typically involve subjecting the article, bonded to an embossable substrate, and with the transfer carrier removed, to heat and pressure such as by a heated patterned roller assembly or a patterned heated platen press. For embossed articles it is preferable that the binder layer not be melted during the embossing operation, to preserve the microsphere embedment level, while at the same time flexible enough to be deformed without cracking. Another method of embossing would be to thermally laminate the transfer article to an irregular substrate such as, for example a coarse fabric such that after the transfer carrier is removed, that the surface is conformed to the irregular layer below it. In some embodiments, thermoforming can be used when processing the presently disclosed articles and transfer articles.

For some applications, it can be desirable to obtain specific bead surface area coverages. In some embodiments, at least about 40% of the surface of the article is covered with the plurality of microspheres. In some embodiments, at least about 60% of the surface of the article is covered with the plurality of microspheres. In some embodiments, the article has at least a portion of a first major surface covered with the plurality of microspheres with coverage greater than or equal to 30% of that portion of the first major surface. In some embodiments, the article has at least a portion of a first major surface covered with the plurality of microspheres with coverage less than or equal to 50% of that portion of the first major surface. In some embodiments, the percent of area covered by microspheres in one area of the film can be one coverage density, such as about 71%. In some embodiments, the percent of area covered by microspheres in another area of the film can be the same or different coverage density, such as 47%. In some embodiments, the percent of area covered by microspheres in yet another area of the film can be the same or different coverage density, such as 44%. In some embodiments, the presently disclosed articles include a plurality of microspheres that are substantially uniformly spaced.

A non-limiting list of exemplary embodiments and combinations of exemplary embodiments of the present disclosure are disclosed below:

1. An article comprising at least a first surface having:
(a) a first binder layer selected from at least one of linear resins and resins having low cross link densities, wherein the first binder layer has a first major surface opposite a second major surface; and
(b) a plurality of microspheres at least partially embedded in the first major surface of the first binder layer.
2. The article of embodiment 1 wherein the resins having low cross link densities are those resins comprising lightly crosslinked material having a molecular weight per crosslink point of greater than about 2,800 g/mol.
3. The article of any of the preceding embodiments wherein the plurality of microspheres are selected from at least one of glass, polymers, glass ceramics, ceramics, metals and combinations thereof.
4. The article of any of the preceding embodiments wherein the linear resins are selected from at least one of the following linear materials: polyurethanes, polyureas, polyurethane ureas, polypolyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof.
5. The article of any of the preceding embodiments wherein the article has an elongation percent at failure of greater than 26%.
6. The article of any of the preceding embodiments wherein at least about 60% of the surface of the article is covered with the plurality of microspheres.
7. The article of any of the preceding embodiments further comprising a second layer disposed along the second major surface of the first binder layer.
8. The article of embodiment 7 wherein the second layer comprises a thermoformable material.
9. The article of embodiment 7 wherein the second layer comprises a material having a glass transition temperature greater than or equal to 60° C. and less than or equal to 130° C.
10. The article of any of the preceding embodiments wherein the second layer is amorphous polyester.
11. An article comprising a first surface having:
(a) a first binder layer selected from at least one of linear resins and resins having low cross link densities, wherein the first binder layer has a first major surface opposite a second major surface; and
(b) a plurality of microspheres at least partially embedded in the first major surface of the first binder layer, wherein for at least a portion of the first major surface the plurality of microspheres covers greater than or equal to 30% of that portion of the first major surface and less than or equal to 50% of that portion of the first major surface,
and further wherein the microspheres are substantially uniformly spaced.
12. The article of embodiment 11 wherein the first surface has a shape having at least one angle greater than or equal to 80°.
13. The article of embodiments 11 or 12 wherein the resins having low cross link densities are those resins comprising lightly crosslinked material having a molecular weight per crosslink point of greater than about 2,800 g/mol.
14. The article of any of embodiments 11 to 13 wherein the plurality of microspheres are selected from at least one of glass, polymers, glass ceramics, ceramics, metals and combinations thereof.
15. The article of any of embodiments 11 to 14 wherein the linear resins are selected from at least one of the following linear materials: polyurethanes, polyureas, polyurethane ureas, polyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof.
16. The article of any of embodiments 11 to 15 wherein the article has an elongation percent at failure of greater than 26%.
17. The article of any of embodiments 11 to 16 wherein at least about 60% of the surface of the article is covered with the plurality of microspheres.
18. The article of any of embodiments 11 to 17 further comprising a second layer disposed along the second major surface of the first binder layer.

19. The article of embodiment 18 wherein the second layer comprises a thermoformable material.

20. The article of embodiments 18 wherein the second layer comprises a material having a glass transition temperature greater than or equal to 60° C. and less than or equal to 130° C.

21. The article of any of embodiments 11 to 20 wherein the second layer is amorphous polyester.

Various modifications and alterations of this invention will become apparent to those skilled in the art without departing from the scope and spirit of this invention.

EXAMPLES

Materials

| Designation | Description |
| --- | --- |
| DISPERCOLL U54 | A 50% solids, aqueous, anionic dispersion of a polyurethane resin, from Bayer Materials Science LLC, Pittsburgh, PA. |
| BAYHYDUR 302 | A solvent free, water dispersible, liquid polyisocyanate resin based on hexamethylene diisocyanate, having an equivalent weight of 243, from BayerMaterials Science LLC, Pittsburgh, PA. This material was vacuum degassed at 70° C. prior to use. |
| DESMODUR W | A liquid cycloaliphatic diisocyanate, dicyclohexylmethane diisocyanate, having an equivalent weight of 132 maximum, an NCO content of 31.8% minimum, and a solidification point of 25° C., from Bayer Materials Science LLC, Pittsburgh, PA. This material was vacuum degassed at 70° C. prior to use. |
| DESMODUR N3300A | A solvent free, polyfunctional, aliphatic isocyanate resin based hexamethylene diisocyanate (HDI) having an equivalent weight of approximately 193, an NCO content of 21.8%, and a monomeric HDI content of 0.2% maximum, from Bayer Materials Science LLC, Pittsburgh, PA. This material was vacuum degassed at 70° C. prior to use. |
| DESMODUR VP LS 2371 | A developmental product of a 100% solids, liquid polyether prepolymer based on isophorone diisocyanate, having an NCO content of 3.7%, from Bayer Materials Science LLC, Pittsburgh, PA. This material was vacuum degassed at 70° C. prior to use. |
| DESMODUR XP 2617 | A 100% solids, largely linear, liquid isocyanate prepolymer based on hexamethylene diisocyanate, having an average equivalent weight of 328, and an isocyanate content of 12-13%. This material was vacuum degassed at 70° C. prior to use. |
| ADIPRENE LW 520 | A viscous, liquid, polyether based urethane polymer based on an aliphatic diisocyanate, having an isocyanate content of 4.6-4.9%, from Chemtura Corporation, Middlebury, CT. This material was vacuum degassed at 70° C. prior to use. |
| 3M SCOTCHWELD Repair Paste 2110 | A 100% solids-based, liquid, two part polyurethane resin paste that cures to a black erosion resistant polyurethane elastomer, available from 3M Company, St. Paul, MN. This material was vacuum degassed at 70° C. prior to use. |
| CLEARLINK 1000 | A liquid, aliphatic diamine having an equivalent weight of 157-166, from Dorf Ketal LLC, Stafford, TX. This material was vacuum degassed at 70° C. prior to use. |
| 1,4-Butanediol | A liquid diol having a molecular weight of 90 and a boiling point of 23° C., available from Chemtura Corporation, Middlebury, CT. This material was vacuum degassed at 70° C. prior to use. |
| UNOXOLDIOL | A liquid, cycloaliphatic diol composed of approximately a 1:1 mixture of (cis, trans)-1,3-cyclohexanedimethanol and (cis, trans)-1,4-cyclohexanedimethanol, having a molecular weight of 144 and a calculated hydroxyl number of 778, and boiling point of 276° C., from Dow Chemical Company, Midland, MI. This material was vacuum degassed at 70° C. prior to use. |
| 1,4-CHDM | A mixture of cis and trans 1,4-cyclohexanedimethanol, which may be in either a solid or liquid form, having a molecular weight of 144, from Sigma-Aldrich, St. Louis, MO. This material was vacuum degassed at 70° C. prior to use. |
| FOMREZ 44-111 | A solid, hydroxyl terminated, saturated, linear based on poly(butylenes adipate) glycol, having a hydroxyl number of 110-114, from Chemtura Corporation, Middlebury, CT. This material was vacuum degassed at 70° C. prior to use. |
| K-FLEX 188 | A liquid aliphatic polyester polyol, having a hydroxyl number of 230 and a hydroxyl equivalent weight of 244, from King Industries Specialty Chemicals,, Norwalk, CT. This material was vacuum degassed at 70° C. prior to use. |
| DEGBE | Diethylene glycol butyl ether, a liquid having a formula weightof 162, from Sigma-Aldrich, St. Louis, MO. |
| TERATHANE 650 | Polytetramethylene ether glycol, a waxy solid having a molecular weight of 625-675, a hydroxyl number of 166-180, and a melting point of 11-19° C., from Invista, Wichita, KS. This material was vacuum degassed at 70° C. prior to use. |

-continued

| Designation | Description |
| --- | --- |
| T12 | DABCO T-12 catalyst, dibutyltin dilaurate (DBTDL), a liquid catalyst, Air Products and Chemicals, Incorporated, Allentown, PA. |
| Borosilicate glass microsphere beads | Type 1 borosilicate glass microsphere beads having an average size in the range of 38-75 micrometers, a refractive index of 1.47 as determined by the standard Becke line method, and a density of 2.23 g/cc, obtained from Mo Sci Incorporated, Rolla, MO. |
| Borosilicate glass powder | Milled borosilicate glass powder having a size distribution of less than 200 mesh and density of 2.23 g/cc, available under the trade designation "PYREX 7740" from Strategic Materials Incorporated, Houston TX. |
| Soda lime silicate microsphere beads | Silane treated soda lime silicate microsphere beads having an average size in the range of 44-53 micrometers, a refractive index of 1.52 as determined by the standard Becke line method, and a density of 2.52 g/cc, obtained from Swarco Industries, Incorporated, Columbia, TN. |
| SILQUEST A1100 | A gamma-Aminopropyltrimethoxysilane, a clear liquid coupling agent, from Momentive Performance Materials Incorporated, Columbus, OH. |
| MEK | methyl ethyl ketone |
| PET 1 | A clear, amorphous, copolyester film having a nominal thickness of 0.13 mm (0.005 inches) or 0.25 mm (0.010 inches) and a glass transition temperature of 80° C. (DSC), available under the trade designation "EASTAR 6763" from Eastman Chemical Company, Kingsport, TN. |
| PET 2 | A clear, amorphous, copolyester film having a nominal thickness of 0.13 mm (0.005 inches) and a glass transition temperature of 110° C. (DSC), available under the trade designation "TRITAN FX100" from Eastman Chemical Company, Kingsport, TN. The received film was corona treated in air for 20 seconds no more than 30 minutes prior to use. |
| PC | A clear polycarbonate film having a glass transition temperature of 153° C., available under the trade designation "LEXAN 8010" from SABIC Innovative Plastics, Pittsfield, MA. |

Test Methods

Dynamic Mechanical Test (DMA) for Modulus

Free-standing bead films having thicknesses ranging from 0.1 to 0.3 mm (0.004 to 0.012 inches) were evaluated for their storage modulus (E') at room temperature (approximately 23° C.) using a dynamic mechanical analyzer (Model Q800 DMA, TA Instruments, New Castle, Del.) in a controlled stress mode, with a force of 0.2 N, a tensile grip separation distance of between 15 cm and 19 cm, and a temperature ramp rate of 3° C./minute. The bead film samples had a width of 6.2 mm. Samples were run through a temperature sweep starting at 0° C. up to 200° C. or until they yielded. For each example evaluated one sample was run.

Pencil Hardness

Free-standing bead films were evaluated for pencil hardness according to ASTM D 3363. Abrasive sandpaper (Grit No. 400) was adhered to a flat and smooth benchtop with double coated tape. Pencil leads (Totiens Drawing Leads with mechanical lead holder) were held at an angle of 90° to the abrasive paper and abraded until a flat, smooth, circular cross-section was achieved, free of chips or nicks on the edge of the lead. The force on the tip of the pencil was fixed at 7.5 N or in some cases less. The free-standing bead film was placed on a glass surface. Using a freshly prepared pencil lead for each test, the lead was pressed firmly against the film at a 45° angle and at the desired load (7.5 N) using an Elcometer 3086 Motorised Pencil Hardness Tester (obtained from Elcometer Incorporated, Rochester Hills, Mich.) and drawn across the test panel in the "forward" direction for a distance of at least ¼ inch. Three pencil tracks were made for each grade of lead hardness. Prior to inspection, crumbled lead was removed from the test area using a damp paper towel wetted with isopropyl alcohol. The film was inspected by eye for defects and under an optical microscope (50×-1000× magnification) for the first ⅛ to ¼ inch of each pencil track. Moving from harder leads to softer, the process was repeated down the hardness scale until a pencil was found that did not scratch the film or rupture it, or dislodge or partially dislodge any beads. At least two of three tracks at each lead hardness were required to meet these criteria in order to pass. The hardest level of lead that passed was reported as the pencil hardness of the film.

Calculated Crosslink Density

Crosslink density is inversely related to the average molecular weight per crosslink point. The average molecular weight per crosslink point can be calculated using the same general concept as disclosed in U.S. Pat. No. 6,040,044. The equation is:

Average molecular weight per crosslink point=Total weight/number of crosslink points The total weight was calculated by first calculating the product of (the number of moles)*(the molecular weight) for each component, and then summing the products for each component in the formulation. This may also be written as:

SIGMA(number of moles of each component incorporated×molecular weight of each component)

The number of crosslink points can be calculated as the density of the crosslink points multiplied by the volume of the material. The density of crosslink points can be calculated using the method described in *Macromolecules*, Vol. 9, No. 2, pages 206-211 (1976). One case involves step-growth copolymerizations with arbitrary functional groups of type A with some molecules having more than two functional groups per molecule and functional groups type B with molecules all having two functional groups per molecule. In this case, the density of crosslink points joining m chains, denoted $[X_m]$, can be calculated with the equation:

$$[X_m] = \sum_{f_i=m}^{f_k} [A_{fi}]_0 P(X_{m,fi})$$

which is equation 49 in the *Macromolecules* reference. In this equation, $f_i$ is the degree of functionality of a comonomer, $f_k$ is the highest functionality in the system, m ranges from 3 to $f_k$, $[A_{fi}]_0$ is the initial concentration of comonomers with functionality $f_i$, and $P(X_{m,fi})$ is the probability that a monomer of functionality $f_i$ acts as a crosslink point for exactly m chains. The total crosslink density, $[X]$, is the sum of all $[X_m]$ from m=3 to $f_k$. The probability $P(X_{m,fi})$ can be calculated by the equation:

$$P(X_{m,fi}) = \binom{f_i}{m} P(F_{Aout})^{f_i-m}[1 - P(F_{Aout})]^m$$

which is equation 45 in the *Macromolecules* reference, where $P(F_{Aout})$ is the probability that an arbitrary functional group is not chemically bound to a complementary chemical group attached to an infinite polymer network. This probability can be found by numerically solving the equation:

$$rp^2 \sum_i a_{fi} P(F_{Aout})^{f_i-1} - P(F_{Aout}) - rp^2 + 1 = 0$$

which is equation 22 in the *Macromolecules* reference. In this equation, p is the reaction conversion of the chemical functionalities of type A, r is the molar ratio of functional groups A to functional group B, and $a_f$ is the mole fraction of functional groups on molecules with functionality f.

Similar equations are taught in the *Macromolecules* reference that can be used to calculate the number of crosslinking points in other types of chemical systems. These other types of chemical systems include chain addition polymerizations or step-growth copolymerizations involving components having functionality greater than two for two distinct types of functional groups.

It should be noted that these calculations do not account for moisture introduced into the reaction as a contaminant, which can lower the actual crosslink density compared to the calculated expected crosslink density. A slight excess of moles of isocyanate functionality can be added relative to the moles of hydroxyl or amine functionality to account for contaminant moisture. Also, these equations do not account for moisture curing that may occur when excess moles of isocyanate functionality are added relative to the moles of hydroxyl or amine functionality, and this moisture curing can increase the actual crosslink density compared to the expected crosslink density.

Elevated Temperature Tensile Test

Free-standing bead films were evaluated for their elongation to failure at temperatures similar to those employed in their respective thermoforming evaluations. Tensile testing was run according to ASTM D882-10 using samples measuring 12 mm (0.5 inches) wide by approximately 102 mm (4 inches) long. Each end of the sample was wrapped in a silicone adhesive based tape, commercially available under the trade designation "3M Polyester Tape 8403" from 3M Company, St. Paul, Minn., such that 25.4 mm (1 inch) of the length was covered at each end. The samples were loaded into the grips of an oven equipped tensile tester such that the original grip separation distance was 5.08 mm (2 inches). The oven was then heated to the test temperature and the samples equilibrated there for three minutes before initiating the elongation step at a rate of 50.8 cm (20 inches)/minute. The test was stopped either when the sample failed or it reached an elongation of 300%. Two to three samples were run and the average reported. Example 15A was run using a rate of 5.08 cm (2 inches)/minute on a sample that was 5.0 mm wide by 3.5 cm in length.

Stretching of Free-Standing Bead Film 1A

Free-standing bead film samples of Example 1A having initial dimensions of 10 cm×10 cm (4 inches×4 inches) were biaxially oriented using a KARO IV lab film orienter (Brueckner Maschinenbau GmbH, Siegsdorf, Germany). The films were loaded into the grips of the stretcher which was then introduced into the stretching oven and heated for two minutes at 70° C. followed by biaxially stretching of the films to ratios of 1.25, 1.75, 2.0, 2.25, 2.5, and 3.0 at a rate of 10% per second. Additional samples were uniaxially oriented to stretch ratios of 2.0 and 2.5. After stretching, the samples were cooled with compressed air at approximately 20° C. and removed from the grips. Stretching decreases the areal density of the beads.

Coefficient of Friction Testing on Stretched Free-Standing Bead Film 1A

Stretched free-standing bead film samples were evaluated for coefficient of friction using a table top peel tester. A 3.2 mm (0.013 inch) thick elastomeric foam having a density of about 0.25 g/cc was adhered to a flat steel substrate measuring 63.5 mm (2.5 inches) square, having a thickness of about 6 mm (0.024 inches), and weighing approximately 200 grams including the foam. Next, a free-standing bead film having a length of 63.5 mm (2.5 inches) that was approximately 5 mm longer than the substrate was place over the foam covered surface of the substrate such that the film was wrapped around the leading edge of the substrate. A hole was cut in the film to accommodate the pin by which the substrate was pulled during testing. This test article was placed with the film side down on an isopropyl alcohol wiped glass surface measuring at least 15.2 cm by 25.4 cm (6 inches by 10 inches). A table top peel tester was used in the coefficient of friction mode to pull the test article across the glass surface at a rate of about 2.29 meters/minute (90 inches/minute) for at least about 5 seconds. The transducer was calibrated with the force from the weight of the steel substrate with foam as 1.00. In this way pulling forces were directly read out as coefficient of friction (COF). The dynamic (kinetic) coefficient of friction was determined by evaluating the graph of the COF values beginning one second after the start of the measurement. Data was collected at a rate of 10 readings/second and the average was recorded. Three samples were run for each film and the average of these three coefficient of friction measurements was reported.

Taber Abrasion Resistance on Stretched Free-Standing Bead Film 1A

Stretched free-standing bead film samples were evaluated for linear Taber abrasion resistance using a Model 5900 Reciprocating Abraser (from Taber Industries, Incorporated, North Tonawanda, N.Y.). An abradant, commercially available under the trade designation "CALIBRASE CS-17" and a 1 kg (2.2 lb.) weight were employed. The track length of 2.54 cm (1 inch) was traversed at a frequency of 25 cycles/minute. The samples were then observed under a light microscope or a scanning electron microscope to evaluate abrasion resistance as measured by the loss of beads from the film and scratching of the polyurethane surface. An acceptable result was one in which there was some or no scratching of the polyurethane surface even though there may have been broken beads still embedded in the surface or a small amount of beads lost from the surface. This test is a measure of the effect of stretching on abrasion resistance of the films.

Optical Analysis of Thermoformed Bead Film Laminate 3B

A thermoformed bead film laminate made from Example 3B was imaged in three places—an unformed area on the perimeter of the film, an area at the base of the formed shape, and a corner at the top of the formed shape. The highest strains in the thermoformed sample were anticipated to be in either of the latter two areas. The images were captured using an optical microscope and particle analysis was conducted using imageJ software (available at rsbweb.nih.gov/ij/).

Taber Abrasion Resistance on Thermoformed Bead Film Laminates 2B and 3B

Thermoformed bead film laminates were evaluated for linear Taber abrasion resistance as described above.

Cyclic Flexibility Test on Free-Standing Bead Film 15A

A free-standing bead film sample was evaluated for cyclic flexibility using a custom cyclic flexibility test. A sample of 2.54 cm (1 inch) width is clamped between four steel plates with a gap of 3.5 mm between top two plates and bottom two plates. The plates are placed within an MTS 810 uniaxial hydraulic load frame (MTS Systems Corporation, Eden Prairie, Minn.) and cycled at 1 hz oscillation frequency with gage of 3.5 mm and amplitude of −2.5 mm to +0 displacement, i.e. free part of sample becomes hinge which is extended back and forth 90 degrees with no tensile loading. A digital microscope, commercially available under the trade designation "Keyence VHX600" from Keyence America, Itasca, Ill., captured images of the stressed region of sample every 1000 cycles as the sample was cycled up to 100,000 cycles. An acceptable result was a film that could be cycled through the duration of the test without breaking, or cracking, according to a visual inspection of the film with the naked eye after conclusion of 100,000 cycles.

Method for Making Bead Film Transfer Articles

Borosilicate Bead Carrier 1

Borosilicate glass microsphere beads were flame treated by passing them through a hydrogen/oxygen flame at a rate of 3 grams/minute and collected in a stainless steel container whereupon metallic impurities were removed using a magnet. The resulting glass microspheres were treated with 600 ppm of Silquest A1100 in the following manner. The silane was dissolved in water, then added to the microsphere beads with mixing, air dried overnight, followed by drying at 110° C. for 20 minutes. The dried, silane treated microsphere beads were then sieved to remove any agglomerates and provide beads having a size of 75 micrometers or less and were free flowing. The resulting transparent silane treated microspheres were cascade coated using a mechanical sifter onto a transfer carrier comprising a polyethylene coated paper substrate which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Borosilicate Bead Carrier 2

A bead carrier having a uniform layer of transparent microsphere beads embedded in the polyethylene layer to a depth corresponding to about 30-40% of their diameter was prepared as described above for Borosilicate Bead Carrier 1 with the following modifications. Borosilicate glass powder was passed through the flame treatment twice before removing metallic impurities.

Soda Lime Silicate Bead Carrier

Soda lime silicate microsphere beads were used to prepare a bead carrier in the same manner as described above for the Borosilicate Bead Carrier 1 with the following modifications. The soda lime silicate microsphere beads were used as received to prepare a bead carrier. The same level of embedment was found as for the borosilicate microspheres.

Thermoforming of Bead Film Laminates

Thermoformable bead film laminates measuring 20.3 cm (8 inches) square were thermoformed using a COMET thermoformer (model C32.5S, MAAC Machinery Corporation, Carol Stream, Ill.). A male test mold having a 6.35 cm (2.50 inches) square base, a height of 1.27 cm (0.5 inches), and various radii and draft angles to its vertical sides was used to form the films (see FIG. 1). The following parameters were employed. The sheet temperature just before molding was measured using a laser sight equipped, portable non-contact (infrared) thermometer, commercially available under the trade designation "ScotchtraklnfraredHeat Tracer IR-16L3" from 3M Company, St. Paul, Minn.

Thermoforming Parameters

| Parameter | PET 1 Laminates | PET 2 Laminates | PC Laminates |
|---|---|---|---|
| Upper Radiant Oven Master Output (%) | 55 | 55 | 55 |
| Lower Radiant Oven Master Output (%) | 55 | 55 | 55 |
| Upper Radiant Oven Compensation (%) | −99 | −99 | −99 |
| Lower Radiant Oven Compensation (%) | 10 | −20 | 20 |
| Bead Film Laminate Preheat Time (seconds) | 8.5 | 8.0 | 13 |
| Oven Door Position | Open | Open | Open |
| Vacuum | Max | Max | Max |
| Pressure Box Working Pressure (MPa) (PSI) | 0.31 (45) | 0.31 (45) | 0.31 (45) |
| Top Platen Delay (seconds) | 0.1 | 0.1 | 0.1 |
| Measured Sheet Temperature Immediately Before Thermoforming (° C.) (° F.) | 92-94 (198-202) | 119-121 (246-250) | 171-188 (340-370) |
| Mold Temperature (° C.) (° F.) | 32-35 (90-95) | 32-35 (90-95) | 32-35 (90-95) |

Example 1A: Free-Standing Bead Film of Water-Based Polyurethane/Soda Lime Silicate Beads A water-based polyurethane binder dispersion was prepared by adding 0.38 grams Bayhydur 302 to 76.0 grams Dispercoll U54 in a 250 ml amber jar and stirring the mixture vigorously for 1 minute. Next, 4.0 grams diethylene glycol n-butyl ether was added over a period of 30 seconds with stirring. The resulting mixture was applied, within 10 minutes of preparation, to a 30.5 cm (12 inches) wide soda lime silicate bead carrier, prepared as described above, using a notch bar coater with a gap setting of 0.28 mm (0.011 inches) greater than the thickness of the bead carrier at a rate of 3.66 meters/minute (12 feet/minute). The binder resin coated bead carrier was then dried in air for one hour at ambient temperature, approximately 23° C. (73° F.), followed by one hour at 70° C. (158° F.) to provide a transfer article having soda lime silicate beads which were embedded in polyethylene on one side and in a water-based polyurethane binder resin on the other. A 0.13 mm (0.005 inches) thick, free-standing bead film of a water-based polyurethane binder resin uniformly coated on one side with partially embedded soda lime silicate microsphere beads was obtained by removal of the transfer carrier.

Example 2A: Free-Standing Bead Film of Water-Based Polyurethane/Soda Lime Silicate Beads Example 2A was prepared in the same manner as Example 1A with the following modification: 0.76 grams Bayhydur 302 was employed. A transfer article having soda lime silicate beads which were embedded in polyethylene on one side and in a water-based polyurethane binder resin on the other side was thus provided. A 0.13 mm (0.005 inches) thick (from bottom of polyurethane film to top of exposed beads on opposite side), free-standing bead film of a water-based polyurethane binder resin uniformly coated on one side with partially embedded borosilicate microsphere beads was obtained by removal of the transfer carrier.

Example 2B: Thermoformable Bead Film Laminate

A sample of 0.13 mm (0.005 inches) thick PET 1 film was laminated to the free-standing bead film of Example 2A on the non-beaded surface of the polyurethane binder resin using a hot roll nip laminator (Catena 65R, from General Binding Corporation, Northbrook, Ill.) having a nip roll temperature setting of 77° C. (170° F.), a laminating speed setpoint of "6", and a nip force setpoint of "maximum". In this manner a thermoformable bead film laminate of a water-based, two part polyurethane layer uniformly coated on one side with exposed, partially embedded soda lime silicate microsphere beads and having a transfer carrier covering the beaded surface was provided. A 0.25 mm (0.010 inches) thick (from bottom of PET 1 film to top of exposed beads on opposite side), thermoformable bead film laminate was obtained by removal of the transfer carrier.

Example 2C: Thermoformable Bead Film Laminate

A sample of 0.13 mm (0.005 inches) thick PET 2 film was laminated to the free-standing bead film of Example 2A on the non-beaded surface of the polyurethane binder resin using a hot roll nip laminator as described in Example 2B. In this manner a thermoformable bead film laminate of a water-based, two part polyurethane layer uniformly coated on one side with exposed, partially embedded soda lime silicate microsphere beads and having a transfer carrier covering the beaded surface was provided. A 0.25 mm (0.010 inches) thick (from bottom of PET 2 film to top of exposed beads on opposite side), thermoformable bead film laminate was obtained by removal of the transfer carrier.

Example 3A: Free-Standing Bead Film of Solvent-Based, Two Part Polyurethane/Soda Lime Silicate Beads A solvent based, two part polyurethane solution was prepared by adding 15.0 grams of Desmodur W (80% solids by weight in MEK), 20.9 grams of Fomrez 44-111 (80% solids by weight in MEK), and 5.23 grams of Unoxol (80% solids by weight in MEK) to a 250 ml amber jar. This binder resin mixture was stirred for one minute after which 10 microliters of T12 and stirring continued for another minute. The approximate ratio of equivalents isocyanate to equivalents hydroxyl was 1:1. The binder resin was then was applied to a soda lime silicate bead carrier as described in Example 1 with the following modifications. The gap setting was 0.18 mm (0.007 inches) and the rate was 3.05 meters/minute (10 feet/minute). The binder resin coated bead carrier was then dried in air for one hour at ambient temperature, approximately 23° C. (73° F.), followed by one hour at 70° C. (158° F.) to provide a transfer article having soda lime silicate beads which were embedded in polyethylene on one side and in a solvent-based polyurethane binder resin on the other.

Example 3B: Thermoformable Bead Film Laminate

A sample of 0.13 mm (0.005 inches) thick PET 1 film was laminated to the free-standing bead film of Example 3A on the non-beaded surface of the polyurethane binder resin using a hot roll nip laminator as described in Example 2B. In this manner a thermoformable bead film laminate of a solvent-based, two part polyurethane layer uniformly coated on one side with exposed, partially embedded soda lime silicate microsphere beads and having a transfer carrier covering the beaded surface was provided. A 0.33 mm (0.013 inches) thick thermoformable bead film laminate was obtained by removal of the transfer carrier.

Example 3C: Thermoformable Bead Film Laminate

A sample of 0.13 mm (0.005 inches) thick PET 2 film was laminated to the free-standing bead film of Example 3A on the non-beaded surface of the polyurethane binder resin using a hot roll nip laminator as described in Example 2B. In this manner a thermoformable bead film laminate of a solvent-based, two part polyurethane layer uniformly coated on one side with exposed, partially embedded soda lime silicate microsphere beads and having a transfer carrier covering the beaded surface was provided. A 0.33 mm (0.013 inches) thick thermoformable bead film laminate was obtained by removal of the transfer carrier.

Example 4A: Free-Standing Bead Film of a 100% Solids-Based, Two Part Polyurethane/Borosilicate Beads A liquid binder resin, commercially available under the trade designation "3M Scotchweld Repair Paste 2110" was preheated to 41° C. (105° F.) and then coated between a 30.5 cm (12 inches) wide borosilicate bead carrier 1 and a silicone-coated polyester film release liner using a notchbar coater having a gap setting of 0.13 mm (0.005 inches) (greater than the combined thickness of the bead carrier and release liner) at a rate 3.66 meters/minute (12 feet/minute). The binder coated bead carrier was then was heated at 70° C. (158° F.) for one hour in a forced air convection oven followed by cooling at ambient temperature to provide a transfer article having borosilicate beads which were embedded in polyethylene on one side and in a 100% solids-based, two part polyurethane binder resin on the other side. A 0.20 mm (0.008 inches) thick, free-standing bead film of a 100% solids-based, two part polyurethane binder resin uniformly coated on one side with partially embedded borosilicate microsphere beads was obtained by removal of both the transfer carrier and silicone-coated polyester film release liner.

Example 4B: Thermoformable Bead Laminate

A sample of 0.13 mm (0.005 inches) thick PET 1 film was laminated to the free-standing bead film of Example 4A on the non-beaded surface of the polyurethane binder resin using a hot roll nip laminator as described in Example 2B. In this manner a thermoformable bead film laminate of a 100% solids-based, two part polyurethane layer uniformly coated on one side with exposed, partially embedded borosilicate microsphere beads and having a transfer carrier covering the beaded surface was provided. A 0.33 mm (0.013 inches) thick thermoformable bead film laminate was obtained by removal of the transfer carrier.

Example 5A: Free-Standing Bead Film of a 100% Solids-Based, Two Part Polyurethane/Soda Lime Silicate Beads A two-part polyurethane mixture was prepared by combining and mixing the following components in a cup using a centrifugal resin mixer (MAX 40 mixing cup and FlackTek Speedmixer DAC 150 FV; both from FlackTec Incorporated, Landrum, S.C.) at 2500 rpm for 30 seconds under vacuum: 13.65 g Desmodur XP2617, 0.35 g N3300A, and 1.91 g 1,4-butanediol. Five microliters of T12 was then added, and the solution was mixed for an additional 30 seconds at 2500 rpm under vacuum in the centrifugal mixer. The approximate ratio of equivalents isocyanate to equivalents hydroxyl was 1.025:1. The resulting 100% solids, two part polyurethane binder resin was then coated between a 30.5 cm (12 inches) wide soda lime silicate bead carrier and a silicone-coated polyester film release liner using a notchbar coater having a gap setting of 0.05 mm (0.002 inches) (greater than the combined thickness of the bead carrier and release liner) and a pull rate of approximately 3.0 to 3.7 meters/minute (10 to 12 feet/minute). The resulting binder resin coated, release liner covered bead film was cured in a 70° C. (158° F.) forced air oven for one hour to provide a transfer article having soda lime silicate beads which were embedded in polyethylene on one side and in a 100% solids-based, two part polyurethane binder resin on the other. A 0.20 mm (0.008 inches) thick, free-standing bead film of a 100% solids-based, two part polyurethane binder resin uniformly coated on one side with partially embedded soda lime silicate microsphere beads was obtained by removal of both the transfer carrier and the silicone-coated polyester film release liner.

Example 5B: Thermoformable Bead Film Laminate

The polyurethane solution used in Example 5A was also used to prepare a transfer article having a 0.13 mm (0.005 inches) thick PET 1 film in place of the silicone release liner film. In this manner a thermoformable bead film laminate of a 100% solids-based, two part polyurethane layer uniformly coated on one side with exposed, partially embedded soda lime silicate microsphere beads and having a transfer carrier covering the beaded surface was provided. A 0.33 mm (0.008 inches) thick thermoformable bead film laminate was obtained by removal of the transfer carrier.

Example 6A: Free-Standing Bead Film of a 100% Solids-Based, Two Part Polyurethane-Urea/Soda Lime Silicate Beads A transfer article having soda lime silicate beads which were embedded in polyethylene on one side and in a solvent-based, two part polyurethane-urea binder resin on the other was prepared as described in Example 5A with the following modifications. The two-part polyurethane mixture was prepared by mixing 9.75 g Adiprene LW520, 0.25 g N3300A, and 1.57 g HXA CE 425 together for 60 seconds. The approximate ratio of equivalents isocyanate to equivalents amine was 1:1. The resulting binder resin solution was then coated onto the soda lime silicate bead carrier (no top release liner) using a gap setting of 0.08 mm (0.003 inches) (greater than the combined thickness of the bead carrier) and a pull rate of approximately 3.0 to 3.7 meters/minute (10 to 12 feet/minute); then drying and curing at 80° C. (176° F.) for 1 hour. A 0.28 mm (0.011 inches) thick, free-standing bead film of a 100% solids-based, two part polyurethane-urea binder resin uniformly coated on one side with partially embedded soda lime silicate microsphere beads was obtained by removal of the transfer carrier.

Example 6B: Thermoformable Bead Film Laminate

A sample of 0.25 mm (0.010 inches) thick PET 1 film was laminated to the free-standing bead film of Example 6A on the non-beaded surface of the polyurethane binder resin using a hot roll nip laminator as described in Example 2B. In this manner a thermoformable bead film laminate of a 100% solids-based, two part polyurethane-urea layer uniformly coated on one side with exposed, partially embedded soda lime silicate microsphere beads and having a transfer carrier covering the beaded surface was provided. A 0.53 mm (0.021 inches) thick thermoformable bead film laminate was obtained by removal of the transfer carrier.

Example 7A: Free-Standing Bead Film of a 100% Solids-Based, Two Part Polyurethane-Urea/Soda Lime Silicate Beads A transfer article having beads which were embedded in polyethylene on one side and in a 100% solids-based, two part polyurethane-urea binder resin on the other was prepared as described in Example 6A with the following modifications. The two-part polyurethane mixture prepared by mixing 9.76 g Adiprene LW520, 0.34 g N3300A together for two separate 30 second periods followed by addition of 2.05 g ClearLink 1000 and mixing for 30 seconds. The approximate ratio of equivalents isocyanate to equivalents amine was 1:1. The gap setting was 0.5 mm (0.02 inches) and the pull through rate was approximately 3.0 to 3.7 meters/minute (10 to 12 feet/minute). A 0.7 mm (0.027 inches) thick, free-standing bead film of a 100% solids-based, two part polyurethane-urea binder resin uniformly coated on one side with partially exposed, embedded soda lime silicate microsphere beads was obtained by removal of the transfer carrier.

Example 7B: Thermoformable Bead Film Laminate

A transfer article was prepared in the following manner. To 2.5 grams of MEK were added 9.76 g Adiprene LW520 and 0.34 g N3300A which was then mixed for 30 seconds followed by addition of 2.05 g ClearLink 1000 and mixing for 30 seconds more. The approximate ratio of equivalents isocyanate to equivalents amine was 1:1. The gap setting was 0.18 mm (0.007 inches) and the pull through rate was approximately 3.0 to 3.7 meters/minute (10 to 12 feet/minute). The binder resin coated bead carrier was then dried in air for one hour at ambient temperature, approximately 23° C. (73° F.), followed by one hour at 70° C. (158° F.) to provide a transfer article having soda lime silicate beads which were embedded in polyethylene on one side and in a solvent-based polyurethane binder resin on the other.

A 0.13 mm (0.005 inches) thick, free-standing bead film of a solvent-based, two part polyurethane-urea binder resin uniformly coated on one side with exposed, partially embedded soda lime silicate microsphere beads was obtained by removal of the transfer carrier. A sample of 0.25 mm (0.010 inches) thick PET 1 film was laminated to the free-standing bead film described above on the non-beaded surface of the polyurethane binder resin using a hot roll nip laminator as described in Example 2B. In this manner a thermoformable bead film laminate of a solvent-based, two part polyurethane-urea layer uniformly coated on one side with exposed, partially embedded soda lime silicate microsphere beads and having a thickness of 0.38 mm (0.015 inches) was obtained.

Example 8A: Free-Standing Bead Film of a 100% Solids-Based, Two Part Polyurethane-Urea/Soda Lime Silicate Beads A transfer article having soda lime silicate beads which were embedded in polyethylene on one side and in a 100% solids-based, two part polyurethane-urea binder resin on the other side was prepared as described in Example 5A with the following modifications. The two-part polyurethane mixture prepared by mixing 9.75 g VPLS 2371, 0.25 g N3300A, and 1.37 g HXA CE 425. The approximate ratio of equivalents isocyanate to equivalents amine was 1:1. The gap setting was 0.10 mm (0.004 inches) and the pull through rate was approximately 3.0 to 3.7 meters/minute (10 to 12 feet/minute). Curing was carried out at 80° C. (176° F.) for 1 hour. A 0.19 mm (0.007 inches) thick, free-standing bead film of a 100% solids-based, two part polyurethane binder resin uniformly coated on one side with partially embedded soda lime silicate microsphere beads was obtained by removal of both the transfer carrier and the silicone-coated polyester film release liner.

Example 8B: Thermoformable Bead Film Laminate

A 0.30 mm (0.012 inches) thick thermoformable bead film laminate of a 100% solids-based, two part polyurethane layer uniformly coated on one side with exposed, partially embedded soda lime silicate microsphere beads was prepared using the polyurethane solution made in Example 8A and employing a 0.13 mm (0.005 inches) thick PET 1 film in place of the silicone release liner film. A thermoformable bead film laminate was obtained by removal of the transfer carrier.

Example 9A: Free-Standing Bead Film of a 100% Solids-Based, Two Part Polyurethane/Soda Lime Silicate Beads A two-part polyurethane mixture was prepared as described in Example 5A with the following modifications. The initial composition was 9.5 grams DesW, 0.5 grams N3300A, 8.48 grams Terethane 650, and 2.11 grams 1,4-butanediol. The amount of T12 added was 19 microliters. The approximate ratio of equivalents isocyanate to equivalents hydroxyl was 1.025:1. The gap setting was 0.05 mm (0.002 inches) greater than the combined thickness of the bead carrier and release liner. The resulting film was cured in five stages as follows: 30 minutes at 40° C.; 30 minutes at 50°; 30 minutes at 60° C.; 30 minutes at 70° C.; and finally at 45 minutes at 80° C. A 0.18 mm (0.007 inches) thick, free-standing bead film of a 100% solids-based, two part polyurethane binder resin uniformly coated on one side with partially embedded soda lime silicate microsphere beads was obtained by removal of both the transfer carrier and the silicone-coated polyester film release liner.

Example 9B: Thermoformable Bead Film Laminate

A 0.30 mm (0.012 inches) thick thermoformable bead film laminate of a 100% solids-based, two part polyurethane layer uniformly coated on one side with exposed, partially embedded soda lime silicate microsphere beads was prepared using the polyurethane solution made in Example 9A and employing a 0.13 mm (0.005 inches) thick PC film in place of the silicone release liner film. A thermoformable bead film laminate was obtained by removal of the transfer carrier.

Example 10A: Free-Standing Bead Film of a 100% Solids-Based, Two Part Polyurethane/Soda Lime Silicate Beads A transfer article having beads which were embedded in polyethylene on one side and in a 100% solids-based, two part polyurethane binder resin on the other side was prepared as described in Example 9A with the following modifications. The urethane mixture was prepared with DesW (8.5 grams), N3300A (1.54 grams), Terethane 650 (8.21 grams), BDO (2.07) grams, and 19 microliters of T12). The approximate ratio of equivalents isocyanate to equivalents hydroxyl was 1.025:1. A 0.18 mm (0.007 inches) thick, free-standing bead film of a 100% solids-based, two part polyurethane binder resin uniformly coated on one side with partially embedded soda lime silicate microsphere beads was obtained by removal of both the transfer carrier and the silicone-coated polyester film release liner.

Example 10B: Thermoformable Bead Film Laminate

A 0.30 mm (0.012 inches) thick thermoformable bead film laminate of a 100% solids-based, two part polyurethane layer uniformly coated on one side with exposed, partially embedded soda lime silicate microsphere beads was prepared using the polyurethane solution made in Example 10A and employing a 0.13 mm (0.005 inches) thick PC film in place of the silicone release liner film. A thermoformable bead film laminate was obtained by removal of the transfer carrier.

Example 11A: Free-Standing Bead Film of a 100% Solids-Based, Two Part Polyurethane/Soda Lime Silicate Beads A two-part polyurethane composition was prepared by adding Desmodur W (14.61 grams), N3300A (0.37 grams), Terethane 650 (16.92 grams), and 1,4-CHDM (4.23 g) and 32 microliters of DBTDL (T12) of in a MAX 40 speed mixer cup. The approximate ratio of equivalents isocyanate to equivalents hydroxyl was 1:1. The solution was mixed for 30 seconds in a centrifugal resin mixer at 2500 rpm. The resulting mixture was applied between a 30.5 cm (12 inches) wide soda lime silicate based bead liner and a silicone-coated polyester release liner film and pulled through a notched bar coater with a gap setting of 0.10 mm (0.004 inches) between the liners and the bar. The resulting film was cured in a 70° C. oven for 60 minutes. A 0.19 mm (0.007 inches) thick, free-standing bead film of a 100% solids-based, two part polyurethane binder resin uniformly coated on one side with partially embedded soda lime silicate microsphere beads was obtained by removal of both the transfer carrier and the silicone-coated polyester film release liner.

Example 11B: Thermoformable Bead Film Laminate

A 0.30 mm (0.012 inches) thick thermoformable bead film laminate of a 100% solids-based, two part polyurethane layer uniformly coated on one side with exposed, partially embedded soda lime silicate microsphere beads was prepared using the polyurethane solution made in Example 11A and employing a 0.13 mm (0.005 inches) thick PET 1 film in place of the silicone release liner film. A thermoformable bead film laminate was obtained by removal of the transfer carrier.

Example 12A: Free-Standing Bead Film of a 100% Solids-Based, Two Part Polyurethane/Soda Lime Silicate Beads A polyurethane mixture was prepared using procedure described for Example 9A with the following modifications: Desmodur W (8.76 grams), N3300A (1.24 grams), Terethane 650 (8.28 grams), 1,4-butanediol (2.07) grams, and 19 microliters of T12) were employed. The approximate ratio of equivalents isocyanate to equivalents hydroxyl was 1.025:1. This was used to prepare a transfer article as described in Example 9A. A 0.23 mm (0.009 inches) thick, free-standing bead film of a 100% solids-based, two part polyurethane binder resin uniformly coated on one side with exposed, partially embedded soda lime silicate microsphere beads was obtained by removal of both the transfer carrier and the silicone-coated polyester film release liner.

Example 12B: Thermoformable Bead Film Laminate

A 0.36 mm (0.014 inches) thick thermoformable bead film laminate of a 100% solids-based, two part polyurethane layer uniformly coated on one side with exposed, partially embedded soda lime silicate microsphere beads was prepared using the polyurethane solution made in Example 12A and employing a 0.13 mm (0.005 inches) thick PC film in place of the silicone release liner film. A thermoformable bead film laminate was obtained by removal of the transfer carrier.

Example 13A: Free-Standing Bead Film of a Two Layered Polyurethane/Borosilicate Beads A mixture 10 parts by weight of an isocyanate blend containing 97.5 grams Desmodur W and 2.5 grams Desmodur N3300A was combined with a 13 parts by weight of an 82.3% solids solution in ethyl acetate/methyl isobutyl ketone (1:1 w/w) of Terathane 650/1,4-butanediol (80/20 w/w) containing 900 ppm T12 (based on the combined weight of isocyanate and polyol components) using a static mixer to provide an approximate ratio of 1.025 equivalents isocyanate to 1.0 equivalents hydroxyl. The resulting binder resin mixture was coated onto a borosilicate bead carrier 2 using a notchbar coater with a gap setting of approximately 0.10 mm (0.004 inches) at a pull through rate of approximately 1.5 meters/minute (5 feet/minute). This was then dried and cured in a forced air oven at 90° C. (194° F.) for five minutes. The resulting binder resin coated bead carrier was stored for four days at approximately 23° C. (73° F.) before a layer of 100% solids-based polyurethane coating was applied over the first polyurethane layer. A mixture of 10 parts by weight of an isocyanate blend containing 97.5 grams Desmodur W and 2.5 grams Desmodur N3300A was combined with a 10.7 parts by weight of a polyol blend containing Terathane 650/1,4-butanediol (80/20 w/w) and 900 ppm T12 (based on the combined weight of isocyanate and polyol components) using a static mixer to provide a 100% solids mixture having an approximate ratio of 1.025 equivalents isocyanate to 1.0 equivalents hydroxyl. The mixture was then coated between the binder resin coated bead carrier and a silicone-coated polyester film release liner using a notchbar coater with a gap setting of approximately 0.13 mm (0.005 inches) at a pull through rate of approximately 1.5 meters/minute (5 feet/minute), The second layer coated article was then cured at 90° C. (194° F.) for 5 minutes. A transfer article having borosilicate microsphere beads which were embedded in polyethylene on one side and in a two layered polyurethane resin on the other side was thus provided. A 0.18 mm (0.007 inches) thick, free-standing bead film of a two layered polyurethane binder resin uniformly coated on one side with exposed, partially embedded borosilicate microsphere beads was obtained by removal of both the transfer carrier and the silicone-coated polyester film release liner.

Example 13B: Thermoformable Bead Film Laminate

A 0.30 mm (0.012 inches) thick thermoformable bead film laminate having a two layered polyurethane binder resin uniformly coated on one side with exposed, partially embedded borosilicate microsphere beads was prepared as described in Example 13A with the following modification. A 0.13 mm (0.005 inches) thick PET 1 film was used in place of the silicone release liner film. A thermoformable bead film laminate was obtained by removal of the transfer carrier.

Example 14A: Free-Standing Bead Film of a Two Part Polyurethane-Urea/Soda Lime Beads A transfer article having soda lime beads which were embedded in polyethylene on one side and in a solvent-based, two part polyurethane-urea binder resin on the other was prepared as described in Example 5A with the following modifications. The two-part polyurethane mixture was prepared by mixing 9.5 g Adiprene LW520, 0.5 g N3300A, and 1.81 g HXA CE 425 together for 60 seconds. The approximate ratio of equivalents isocyanate to equivalents amine was 1:1. The resulting binder resin solution was then coated onto the soda lime bead carrier (no top release liner) using a gap setting of 0.08 mm (0.003 inches) (greater than the combined thickness of the bead carrier) and a pull rate of approximately 3.0 to 3.7 meters/minute (10 to 12 feet/minute); then drying and curing at 80° C. (176° F.) for 1 hour. A 0.28 mm (0.011 inches) thick, free-standing bead film of a solvent-based, two part polyurethane-urea binder resin uniformly coated on one side with partially embedded soda lime microsphere beads was obtained by removal of the transfer carrier.

Example 15A: Free-Standing Bead Film of a Two Layered Polyurethane/Borosilicate Beads A mixture of 10 parts by weight of an isocyanate blend containing 93.3 grams Desmodur W and 6.7 grams Desmodur N3300A was combined with 14.2 parts by weight of an 90% solids solution in ethyl acetate/methyl isobutyl ketone (1:1 w/w) of Terathane 650/1,4-butanediol (87.8/12.2 w/w) containing 1000 ppm T12 (based on the combined weight of isocyanate and polyol components) using a static mixer to provide an approximate ratio of 1.16 equivalents isocyanate to 1.0 equivalents hydroxyl. The resulting binder resin mixture was coated onto a borosilicate bead carrier 2 using a notchbar coater with a gap setting of approximately 0.10 mm (0.004 inches) at a pull through rate of approximately 1.5 meters/minute (5 feet/minute). This was then dried and cured in a forced air oven at 90° C. (194° F.) for five minutes. The resulting binder resin coated bead carrier was stored for four days at approximately 23° C. (73° F.) before a layer of 100% solids-based polyurethane coating was applied over the first polyurethane layer. A mixture of 10 parts by weight of an isocyanate blend containing 88.6 grams Desmodur W and 11.4 grams Desmodur N3300A was combined with 13.12 parts by weight of a polyol blend containing Terathane 650/1,4-butanediol (88/12 w/w) and 1000 ppm T12 (based on the combined weight of isocyanate and polyol components) using a static mixer to provide a 100% solids mixture having an approximate ratio of 1.045 equivalents isocyanate to 1.0 equivalents hydroxyl. The mixture was then coated between the binder resin coated bead carrier and a silicone-coated polyester film release liner using a notchbar coater with a gap setting of approximately 0.13 mm (0.005 inches) at a pull through rate of approximately 1.5 meters/minute (5 feet/minute), The second layer coated article was then cured at 90° C. (194° F.) for 5 minutes. A transfer article having borosilicate microsphere beads which were embedded in polyethylene on one side and in a two layered polyurethane resin on the other side was thus provided. A 0.18 mm (0.007 inches) thick, free-standing bead film of a two layered polyurethane binder resin uniformly coated on one side with exposed, partially embedded borosilicate microsphere beads was obtained by removal of both the transfer carrier and the silicone-coated polyester film release liner.

Example 15B: Thermoformable Bead Film Laminate

A 0.30 mm (0.012 inches) thick thermoformable bead film laminate having a two layered polyurethane binder resin uniformly coated on one side with exposed, partially embedded borosilicate microsphere beads was prepared as described in Example 15A with the following modification. A 0.13 mm (0.005 inches) thick PET 1 film was used in place of the silicone release liner film. A thermoformable bead film laminate was obtained by removal of the transfer carrier.

Comparative Example 1A: Free-Standing Bead Film of a Two Layered Polyurethane/Borosilicate Beads A 60% solids solution in MEK of Desmodur N3300A and a 60% solids solution in MEK of K-Flex 188 containing 300 ppm T12 (based on the combined weight of isocyanate and polyol components) were combined using a static mixer in a weight ratio of 9 parts Desmodur N3300A to 14.2 parts K-Flex 188 to provide an approximate ratio of 0.8 equivalents isocyanate to 1.0 equivalents hydroxyl. The resulting binder resin mixture was coated onto a 30.5 cm (12 inches) wide borosilicate bead carrier 1 using a notchbar coater with a gap setting of approximately 0.10 mm (0.004 inches) at a pull through rate of approximately 3.0 to 3.7 meters/minute (10 to 12 feet/minute). This was then dried and cured in a forced air oven at 93° C. (200° F.) for five minutes. The resulting binder resin coated bead carrier was stored for two weeks before a layer of 100% solids-based polyurethane coating was applied. Next, 9.0 grams Desmodur N3300A, 14.2 grams K-Flex 188, and 7 microliters of T12 were combined and mixed in a cup using a centrifugal resin mixer as described in Example 5 at a speed of 3450 rpm for approximately 30 seconds to provide a 100% solids mixture having an approximate ratio of 0.8 equivalents isocyanate to 1.0 equivalents hydroxyl. The mixture was then coated between the binder resin coated bead carrier and a silicone-coated polyester film release liner using a notchbar coater having a gap setting and pull rate of approximately 0.051 mm (0.002 inches) and approximately 3.0 meters/minute (10 feet/minute). The second layer coated article was then cured for 1 hour at 70° C. (158° F.). A transfer article having borosilicate beads which were embedded in polyethylene on one side and in a two layered polyurethane resin on the other side was thus provided. A 0.13 mm (0.005 inches) thick, free-standing bead film of a two layered polyurethane binder resin uniformly coated on one side with exposed, partially embedded borosilicate microsphere beads was obtained by removal of both the transfer carrier and the silicone-coated polyester film release liner.

Comparative Example 1B: Thermoformable Bead Film Laminate

A 0.25 mm (0.010 inches) thick thermoformable bead film laminate having a two layered polyurethane binder resin uniformly coated on one side with exposed, partially embedded borosilicate microsphere beads was prepared as described in Comparative Example 1A with the following modification. A 0.13 mm (0.005 inches) thick PET 1 film was used in place of the silicone release liner film. A thermoformable bead film laminate was obtained by removal of the transfer carrier.

Comparative Example 1C: Thermoformable Bead Film Laminate

A 0.25 mm (0.010 inches) thick thermoformable bead film laminate having a two layered polyurethane binder resin uniformly coated on one side with exposed, partially embedded borosilicate microsphere beads was prepared as described in Comparative Example 1B with the following modification. A 0.13 mm (0.005 inches) thick PET 2 film was used in place of the PET 1 film. A thermoformable bead film laminate was obtained by removal of the transfer carrier.

TABLE 1

Properties of Free-Standing Bead Films

| Ex. | E' @ 23 C. (MPa) | Pencil Hardness Hardness | Pencil Hardness Load (N) |
|---|---|---|---|
| 1A | 410 | ND | ND |
| 2A | 420 | ND | ND |
| 3A | 850 | 9H | 7.5 |
| 4A | 2.5 | 6B | 7.5 |
| 5A | 920 | 9H | 7.5 |
| 6A | 150 | 9H | 7.5 |
| 7A | 150 | 9H | 7.5 |
| 8A | 13 | <6B | 2.5 |
| 9A | 640 | 9H | 7.5 |
| 10A | 600 | 9H | 7.5 |
| 11A | 833 | 9H | 7.5 |
| 12A | 620 | 9H | 7.5 |
| 13A | 570 | 9H | 7.5 |
| 14A | 117 | 3H | 5.0 |
| 15A | 42.1 | <6B | 2.5 |
| CE1A | 223 | 9H | 7.5 |

*ND: not determined.

The results in Table 1 show that those examples having a modulus of 150 MPa or greater exhibited desirable pencil hardness values.

TABLE 2

Properties of Free-Standing Bead Films

| Ex. | Film Thickness (mm) | Tensile Test Temperature ° C. (° F.) | Elongation at Failure (%) |
|---|---|---|---|
| 1A | 0.104 | 70 (158) | >300 |
| 3A | 0.110 | 93 (200) | >100* |
| 4A | 0.360 | 93 (200) | 66 |
| 15A | 0.175 | 23 (73) | 572 |
| CE1A | 0.180 | 93 (200) | 26 |

*equipment stopped beyond 100% elongation for this sample.

The results in Table 2 show that examples of the invention possess greater elongation characteristics than the comparative example. This property is advantageous when the films are used in thermoforming operations.

TABLE 3

Properties of Free-Standing Bead Film 1A

| Stretch Ratio | COF |
|---|---|
| 1 × 1 (Control) | 0.137 |
| 3 × 3 | 0.522 |
| 2.5 × 2.5 | 0.136 |
| 2.25 × 2.25 | 0.158 |
| 2.0 × 2.0 | 0.170 |
| 1.75 × 1.75 | 0.176 |
| 1.25 × 1.25 | 0.163 |
| 2.0 × 1 | 0.152 |
| 2.5 × 1 | 0.163 |

The results in Table 3 show that the low coefficient of friction property of the control film (i.e. the unstretched free-standing bead film) can be maintained even at relatively high elongations, for example at a biaxial stretch ratio of 2.5×2.5.

Results—Taber Abrasion on Stretched Free-Standing Bead Film 1A

Micrographs of abraded bead films, both stretched and unstretched, showed that while some scratching is evident between the beads, especially in the highly stretched samples, a significant protective effect is still provided relative to a bead-free film which would be severely scratched under these same conditions. This is true even at a stretch ratio of 2.5×2.5.

TABLE 4

Properties of Thermoformable Bead Film Laminates

| Ex. | Substrate | Thermoforming Temperature ° C. (° F.) | Thermoformed Laminate Appearance | Calculated Crosslink Density (Mw/X-L) |
|---|---|---|---|---|
| 1B | ND | — | — | ND |
| 2B | PET 1 | 100 (212) | Pass | ND |
| 2C | PET 2 | 127 (236) | Pass | |
| 3B | PET 1 | 99 (211) | Pass | NA |
| 3C | PET 2 | 129 (264) | Pass | |
| 4B | PET 1 | 102 (215) | Pass | 43,100 |
| 5B | PET 1 | 99 (210) | Pass | 107,000 |
| 6B | PET 1 | 110 (230) | Pass | 143,000 |
| 7B | PET 1 | 115 (239) | Pass | 26,700 |
| 8B | PET 1 | 99 (210) | Pass | 34,000 |
| 9B | PC | 179 (355) | Pass | 267,000 |
| 10B | PC | 182 (360) | Pass* | 12,900 |
| 11B-1 | PET 1 | 78 (172) | Fail | 54,000,000 |
| 11B-2 | PET 1 | 81 (177) | Fail | |
| 11B-3 | PET 1 | 92 (197) | Pass | |
| 11B-4 | PET 1 | 103 (218) | Pass | |
| 12B | PC | 179 (354) | Pass | 19,100 |
| 13B | PET 1 | 100 (212) | Pass | 2,000,000 |
| 15B | PET 1 | 122 (251) | Pass | 46,900 |
| CE 1B | PET 1 | 92 (198) | Fail | 2800 |
| CE 1C | PET 2 | 121 (250) | Fail | |

3 samples were evaluated for Ex 10B and one sample exhibited cracking while two did not.
NA: not applicable; sample was not crosslinked.
ND: not determined.

The results in Table 4 show that those examples with calculated crosslink densities of greater than approximately 2800 exhibited acceptable thermoforming characteristics. The results for Examples 11B-1 through 11B-4 suggests the thermoforming temperature should be above the glass transition temperature of the substrate film.

Optical Analysis of Thermoformed Bead Film Laminate 3B

The percent of area covered by microsphere beads in the unformed area of the film was found to be 71%; near the base of the thermoformed shape it was 47%; and at the top corner of the thermoformed shape it was 44%.

Cyclic Flexibility of Free-Standing Bead Film 15A

The free-standing bead film 15A was stable with no cracks or damage through 100,000 cycles of the cyclic flexibility test based on visual inspection of the film with the naked eye.

Results—Taber Abrasion on Thermoformed Bead Film Laminates 2B and 3B

Inspection of micrographs of abraded bead film laminates in both the stretched and unstretched regions showed that, while significant damage to the microsphere beads could be seen along with debris from the abrasive, substantially all the beads remained present after testing and the bead adhesion was good. As a result the beads were expected to still provide protection for the film surface.

What is claimed is:

1. A thermoformed article comprising:
   a first thermoformed binder layer with a first major surface opposite a second major surface, the first binder layer comprising polyurethanes, polyureas, or polyurethane ureas; and
   a plurality of microspheres embedded between 60 and 70% of their diameter in the first major surface of the first binder layer; and wherein the microspheres have a refractive index of no more than 1.57, and wherein the first surface has a pencil hardness of at least 9H when tested according to ASTM D 3363.

2. The thermoformed article of claim 1 wherein the polyurethane, polyureas, or polyurethane ureas have low cross link densities have a molecular weight per crosslink point of greater than about 2,800 g/mol.

3. The thermoformed article of claim 1 wherein the plurality of microspheres are selected from at least one of glass, polymers, glass ceramics, ceramics, metals and combinations thereof.

4. The thermoformed article of claim 1 wherein the article has an elongation percent at failure of greater than 26%.

5. The thermoformed article of claim 1 wherein at least about 60% of the first major surface of the article is covered with the plurality of microspheres.

6. The thermoformed article of claim 1 further comprising a second layer disposed along the second major surface of the first binder layer.

7. The thermoformed article of claim 6 wherein the second layer comprises a material having a glass transition temperature greater than or equal to 60° C. and less than or equal to 130° C.

8. The thermoformed article of claim 7 wherein the second layer is amorphous polyester.

* * * * *